United States Patent
Francois et al.

(10) Patent No.: US 10,030,967 B2
(45) Date of Patent: Jul. 24, 2018

(54) STRAIN MEASURING DEVICE

(71) Applicant: UNIVERSITE DE NANTES, Nantes (FR)

(72) Inventors: Marc Francois, Nantes (FR); Yann Lecieux, Nantes (FR); Dominique Leduc, Nantes (FR); Cyril Lupi, Nantes (FR)

(73) Assignee: UNIVERSITE DE NANTES, Nantes (FR)

( * ) Notice: Subject to any disclaimer, the term of this patent is extended or adjusted under 35 U.S.C. 154(b) by 316 days.

(21) Appl. No.: 14/775,506

(22) PCT Filed: Mar. 13, 2014

(86) PCT No.: PCT/FR2014/050585
§ 371 (c)(1),
(2) Date: Feb. 17, 2016

(87) PCT Pub. No.: WO2014/140496
PCT Pub. Date: Sep. 18, 2014

(65) Prior Publication Data
US 2016/0202133 A1    Jul. 14, 2016

(30) Foreign Application Priority Data
Mar. 13, 2013 (FR) ...................... 13 52216

(51) Int. Cl.
*H01J 40/14* (2006.01)
*G01B 11/16* (2006.01)
*G01L 1/24* (2006.01)

(52) U.S. Cl.
CPC .............. *G01B 11/18* (2013.01); *G01L 1/242* (2013.01)

(58) Field of Classification Search
CPC ........... G01L 1/24; G01L 1/242; G01L 1/246; G01B 11/16; G01B 11/18
USPC ...................... 250/227.14, 227.16; 385/9, 11
See application file for complete search history.

(56) References Cited

U.S. PATENT DOCUMENTS 6,696,974 B1 * 2/2004 Mathis ................... G01B 11/18
324/534
7,174,061 B2 * 2/2007 Rougeault .............. G01B 11/18
385/10

* cited by examiner

*Primary Examiner* — Kevin Pyo
(74) *Attorney, Agent, or Firm* — Miller, Matthias & Hull LLP

(57) ABSTRACT

The invention concerns a device for locally measuring strains within a measurement volume that comprises a test body formed from a homogeneous material of known mechanical properties and ellipsoidal in shape intended to be included in the measurement volume, at least one measurement optical fiber for measuring deformation embedded within said test body and means for linking the at least one measurement optical fiber to a system designed to stimulate the at least one measurement optical fiber, detect signals coming from the fibers and, by means of an electronic system capable of carrying out calculations, determine strains from at least one of the detected signals and known mechanical properties.

16 Claims, 5 Drawing Sheets

STRAIN MEASURING DEVICE

CROSS-REFERENCE TO RELATED APPLICATION

This Application is a 35 USC § 371 US National Stage filing of International Application No. PCT/FR2014/050585 filed on Mar. 13, 2014, and claims priority under the Paris Convention to French Patent Application No. 13 52216 filed on Mar. 13, 2013.

FIELD OF THE DISCLOSURE

The invention concerns a device for measuring stresses or local deformations within a volume that may for example represent a structure or part of a structure.

BACKGROUND OF THE DISCLOSURE

The structures that are very routinely used in architecture, in civil engineering structures and generally in fields linked to mechanics must generally suffer mechanical stresses that can evolve over time. These stresses cause deformations in the volume of these structures that can lead to their mechanical characteristics being degraded. To monitor the qualities of these structures it is necessary to be able to measure the evolution of the deformations that are produced in the volume of these structures.

The evolution of the deformations of the structures and the estimation of the stresses that they suffer may be tracked by devices placed on the external surface of the structures such as visual indicators for the deformations or mechanical sensors responsive to the deformation at the surface of these structures (FR2855210). The deformation within the volume itself may be estimated by integrating a uniaxial sensor or "measurement fiber" such as an optical cord into the volume of the structure itself (WO2006127034). However, these methods at best make it possible to estimate only a mean value along the axis of the sensor of the components of the stresses or deformations in a fiber placed in the volume under surveillance. Finally, direct integration of a sensor into the volume under surveillance may lead to weakening of the structure that may be caused by the mechanical quality difference of the materials constituting the sensor or to modification of the distribution of the stresses in the volume of the structure in the vicinity of the sensor. In the latter case the particular shape of the sensor may lead to local stress concentrations liable to cause the onset of cracking in the vicinity of this sensor. Moreover, the modification of the stress distribution in the vicinity of the sensor compromises the quality of the measurement, with the risk of it no longer ideally reflecting the magnitudes that it is required to measure [which may lead to using these sensors as threshold warning devices rather than as systems for effecting the tracked measurements].

SUMMARY OF THE DISCLOSURE

The present invention aims to improve the quality and the reliability of the measurement of the stresses and deformations occurring locally within a volume.

To this end there is provided a device for measuring stresses and/or local deformations within a measurement volume of a structure of materials having known mechanical properties, the device comprising:

a test body of ellipsoidal shape intended to be included in the measurement volume and constituted of a homogeneous material with known mechanical properties, at least one deformation measurement fiber attached to the interior of said test body so that the deformations of the test body are transmitted to the measurement fiber, and means for connecting the at least one measurement fiber to a system adapted to detect signals coming from the measurement fibers representing the deformations of the measurement fiber and to determine the stresses and/or the local deformations from at least one of the detected signals and the known mechanical properties of the materials of the test body and of the structure.

The test body of ellipsoidal shape is solid. material is sound.

Here stresses and deformations are referred to interchangeably, it being understood that for each material the two magnitudes are linked by Hooke's law.

Where the stresses and the local deformations determined are concerned, these are indeed magnitudes that would be present in the structure at the level of the measurement volume in the absence of the measuring device (i.e. if the material constituting the structure at this location had not been replaced by the test body), and consequently these are the same magnitudes in the vicinity of the test body.

In preferred embodiments of the invention, one or more of the following features may be used:

The measurement fibers are measurement optical fibers.
The connecting means are adapted to connect the measurement fiber to a system adapted to stimulate at least one measurement optical fiber.
The connecting means are devices comprising optical fibers in optical communication with the at least one measurement fiber.

In accordance with another feature, the connecting means are adapted to transmit a stimulation signal to the at least one measurement fiber and to transmit from the at least one measurement fiber a signal resulting from an interaction between the measurement fiber and the stimulation signal.

In accordance with another feature, the measuring device comprises a plurality of (k) deformation measurement fibers attached to the interior of the test body and adapted to determine independent components of the tensor of the stresses in the test body, where k is between 2 and 6. In one particular embodiment, k is equal to 3.

In accordance with another feature, the measuring device may include a plurality of parallel measurement fibers in the same test body.

In accordance with other features, the measuring device may include three deformation measurement fibers or six deformation measurement fibers.

In accordance with another feature, the measurement includes six deformation measurement fibers and the axes of the measurement fibers are substantially perpendicular to the faces of a regular dodecahedron.

In accordance with another feature, the measurement fibers are sections of the same optical fiber and the system is adapted to demodulate information carried by the signals coming from the measurement fibers.

In accordance with another feature, the measuring device further comprises $k_0$ deformation measurement fibers arranged in a non-independent manner in the fibers, where $k_0$ is between 1 and k.

In accordance with another feature, each measurement fiber is attached at its ends to the test body. In accordance with another feature, the measuring device comprises an acquisition system on the downstream side of the connecting means adapted to acquire and to store said signals.

In accordance with another feature, the measuring device further comprises a processor connected to the at least one measurement fiber adapted to determine from the signals spatial components of the field of stresses and/or local deformations.

In accordance with another feature, the test body of the device is constituted of an isotropic material.

In accordance with another feature, the mechanical properties of the material of the test body of the measuring device are identical to those of the sound material constituting the structure.

In accordance with another feature, the connecting means associated with the measuring device are collected together in a single connecting cable.

In accordance with another feature, the measuring device comprises a plurality of interconnected test bodies.

In accordance with another feature, the connecting means are disposed in the form of a net including nodes where the connecting means cross over, a measuring device being fixed at certain nodes or each node.

In accordance with another feature, the measurement fiber is a component separate from the test body.

In accordance with another feature, the measurement optical fiber comprises a waveguide inscribed in the test body.

The invention also relates to a mechanical structure comprising a measurement volume and a measuring device as described above.

Some embodiments also have the advantages described hereinafter.

The device of the invention makes it possible to improve measurement reliability by grouping the measurement means within a sub-volume intended to be integrated within the volume the evolution of which is required to track and made from a material guaranteeing good transmission of the measured magnitudes to the detector.

The improvement in measurement quality is linked to the precise local knowledge of the deformations in a measurement volume and therefore necessitates knowledge of the tensor of the deformations at all points of that volume. The components of this deformation tensor may be represented by a 3×3 matrix.

$$\begin{pmatrix} \varepsilon_{11} & \varepsilon_{12} & \varepsilon_{13} \\ \varepsilon_{21} & \varepsilon_{22} & \varepsilon_{23} \\ \varepsilon_{31} & \varepsilon_{32} & \varepsilon_{33} \end{pmatrix}$$

The symmetry of this tensor implies that it can be entirely determined from six independent components. Finally, when the elasticity constants in the measurement volume are known, the knowledge of the deformations tensor makes it possible to calculate the components of the stresses tensor. In practice, it is difficult to measure the deformations at all points of a measurement volume. It is possible to measure these deformations at a plurality of points and for given directions by disseminating multiple uniaxial sensors in the measurement volume. In accordance with one embodiment, by integrating a plurality of deformation sensors in an appropriate test body, the device of the invention makes it possible to measure values related to the components of the deformations tensor within the volume of the sensor, considered small compared to that of the structure. It can be stated that the field of stresses and that of deformations are uniform within a homogeneous ellipsoidal inclusion buried in an infinite homogeneous medium (see The determination of the elastic field of an ellipsoidal inclusion and related problems, J. D. Eshelby, Proceedings of the Royal Society of London, Vol. 241, (1957), pp. 376-396 and The Elastic Field Outside an Ellipsoidal Inclusion, J. D. Eshelby, Proceedings of the Royal Society of London, Series A, Mathematical and Physical Sciences, Vol. 252, No. 1271 (Oct. 27, 1959), pp. 561-569 and J. D. Eshelby, in Progress in Solid Mechanics Volume II, North Holland Publishing Company, Amsterdam, (1961) and M. Bornert, T. Bretheau, P. Gillormini, Homogénéisation en mécanique des matériaux, Hermes Science, coll. Mécanique et Ingénierie des Matériaux, 2001).

If necessary, the anisotropy properties of the materials are taken into account to estimate these components.

The examples of the present device exploit the above result by proposing to include a test body of ellipsoidal shape in a measurement volume with previously known mechanical properties so that the values of the deformation field therein are substantially uniform and reflect the values of these fields in the measurement volume. The test body of ellipsoidal shape is solid.

The test body can be integrated into the structure by any appropriate means. For example, the test body may have a surface with rough areas or bristles or protrusions for its attachment. The test body is still considered to be an ellipsoid if its envelope shape is ellipsoidal or if the areas of surface roughness have dimensions that are negligible compared to the test body.

In practice the measurement volume is sufficiently large compared to the test body for the variation of the values of the stresses in the test body to be small compared to the required measurement accuracy.

The device of the invention integrating a plurality of deformation sensors with this test body then makes it possible to measure simultaneously therein a plurality of values related to the deformation tensor. Simultaneous estimation of the six independent components of the deformations tensor, and therefore of the stresses tensor, becomes possible by placing in the test body at least six measurement elements oriented in six independent directions in space. To minimize the error in the calculation it is then preferable to orient these six sensors in directions distributed as regularly as possible in space such as directions perpendicular to the faces of a regular dodecahedron.

In parallel with the advantage of using a test body of ellipsoidal shape, so that the values of the deformation field therein are substantially uniform and reflect the value of the stresses in the vicinity of the test body, using the device of the invention makes it possible as a direct consequence of this to avoid causing singularities in the stresses field when it is included in a measurement volume. This therefore avoids generating local stress concentrations liable to lead to the onset of cracking in the vicinity of the test body.

BRIEF DESCRIPTION OF THE DRAWINGS

Other features and advantages of the invention will become apparent in the course of the following description of embodiments given by way of nonlimiting example with reference to the appended drawings.

In the drawings.

DETAILED DESCRIPTION OF THE DISCLOSURE

In the various figures, the same references designate identical or similar elements.

Figure 1:
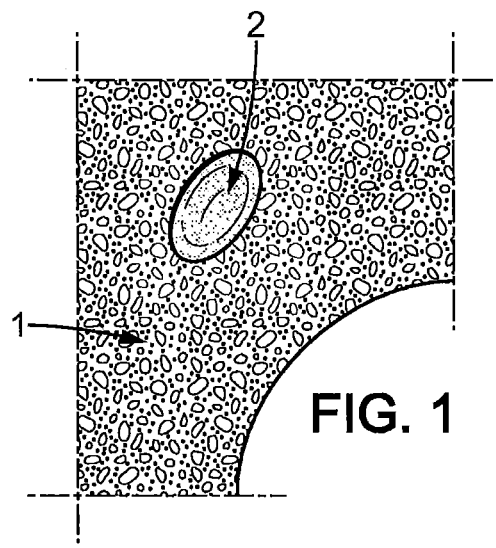
FIG. 1 is a view of a test body placed in a measurement volume that represents a structure part.

FIG. 1 represents diagrammatically a part of a structure 1 for which it is required to determine a deformation or a mechanical stress at a localized location 2. The structure 1 is a rigid structure, for example, such as a civil engineering structure, notably constituted of concrete, where appropriate hollowed out and/or reinforced from place to place.

Figure 2:
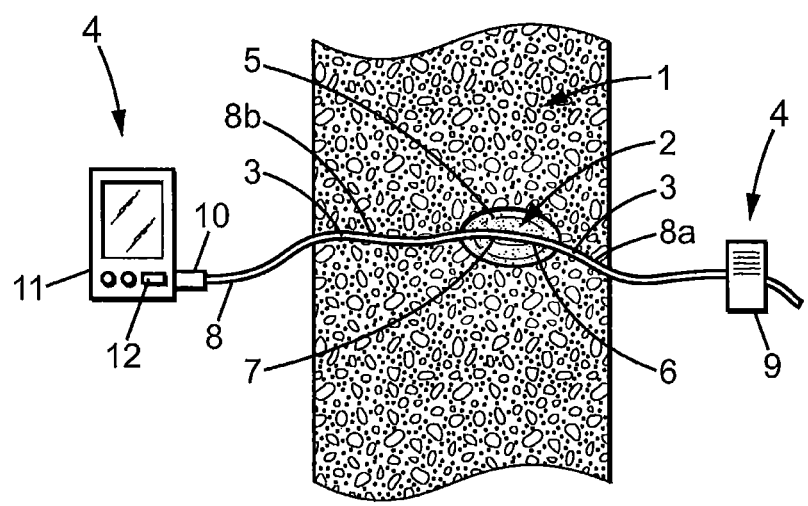
FIG. 2 represents an example with a measurement optical fiber placed in an ellipsoidal test body connected to the outside of the structure with connecting means enabling on the one hand stimulation of the measurement optical fiber and on the other hand transmission of the signals coming from the measurement fibers to an electronic device adapted to perform calculations.

As can be seen in FIG. 2, the structure includes, at the level of the location 2, a void of specific shape, adapted to receive a test body as described hereinafter. Moreover, at least one channel 3 is provided for connecting the void to an instrumentation area 4.

The instrumentation area 4 is for example an area external to the structure 1 or a hollow area within the latter or accessible from the outside of the latter, for example. In the FIG. 2 example, there are two instrumentation areas 4 and two channels 3 on respective opposite sides of the structure 1, although this is merely by way of example. The channels 3 have small transverse dimensions compared to the void and are of sufficient length to extend from the void to the instrumentation area.

Figure 8:
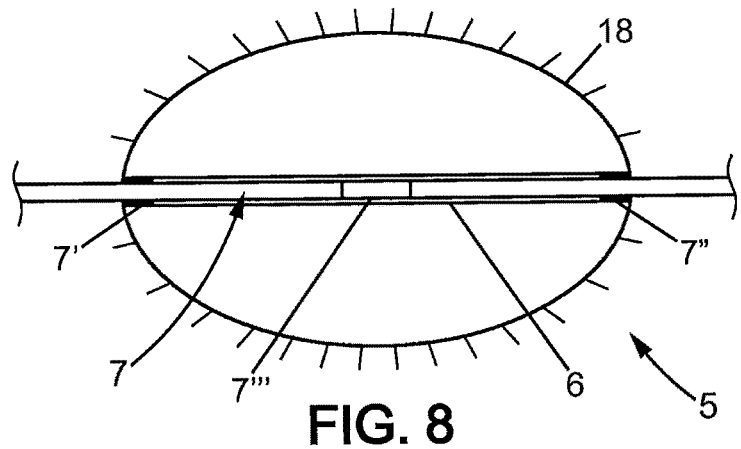
FIG. 8 shows a simplified example of a test body.

The system includes a test body 5 placed in the void, to be described in more detail hereinafter, with reference to FIG. 8. In particular, the exterior perimeter 18 of the test body 5 is fixed to the interior perimeter of the structure 1 at the level of the void in such a manner as to conduct the stresses exerted in the structure 1 to the test body 5. In particular, the test body is fixed to the structure in an integral manner over the entirety of its exterior perimeter (apart from the locations connected to the channels 3, as explained hereinafter). The test body 5 is pierced by at least one channel 6, as represented in FIG. 2, that communicates with the channel 3.

The system includes a measurement fiber 7 that lies in the channel 6. In the example shown, the measurement fiber 7 lies both in the channel 6 and in the channel or channels 3 in communication therewith. Moreover, the measurement fiber 7 is fixed to the interior of the test body 5 so that the stresses exerted in the test body are transmitted to the measurement fiber 7. It is therefore intrinsic that outside the channel 6 or the channels 6 the test body 5 is solid. For example, the ends 7' and 7" of the measurement fiber 7 are fixed to the test body 5 near the surface of the ellipsoid. They may be fixed with the measurement fiber 7 slightly pre-stressed in traction when the test body 5 is not stressed. Alternatively, the measurement fiber 7 could be buried in the test body 5. By way of example, a continuous optical fiber 8 extends from the instrumentation area 4 inside the channel 3, inside the channel 7, inside the second channel 3 and as far as the other instrumentation area 4.

The measurement fiber 7 extends in a rectilinear manner inside the test body in a direction along a given axis. On the other hand, the channels 3 extend in any appropriate direction, in particular to adapt to natural channels of the structure.

An instrumented system is provided for determining the stresses or the deformations in the structure at the level of the location 2. The optical characteristics of the measurement fiber in the location are made dependent on the stresses exerted on it. The measurement fiber 7 includes an active area 7''', for example, equidistant from the ends 7' and 7", for example. The active area has an elasto-optical characteristic, i.e. its optical transmission depends on its tension along the axis of the fiber 7. For example, a Bragg grating is provided adapted to be deformed as a function of the mechanical stresses exerted on the fiber.

Although the present description is give mainly with reference to the embodiment using a measurement optical fiber, other measurement fiber technologies may be envisaged within the context of the invention.

The system also includes an interrogation system including a stimulation device 9 adapted to emit an optical signal in the direction of the measurement fiber 7. This signal is transmitted via the part 8a of the optical fiber 8 that extends from the stimulation device 9 to the test body. The system also includes an acquisition system 10 adapted to detect an optical signal coming from the measurement fiber 7. This signal is transmitted via the part 8b of the optical fiber 8 that extends from the test body to the acquisition device 10. The system also includes a processor 11. For example, the processor is implemented on a printed circuit of a programmable machine, such as a computer, or other machine, and is adapted to process the signals detected by the acquisition system 10, as described in more detail hereinafter.

The processor 11 is able to process information such as data stored in a memory 12 corresponding to signals detected by the acquisition device 10 to determine a stress exerted in the structure 1 at the level of the measurement fiber 7. If the measurement fiber 7 is fixed in the test body, the stress corresponds to a mean stress along the axis of the measurement fiber 7 and additionally, in accordance with the Eshelby theorem, the stress at any point within the test body.

If the dimensions of the test body are small compared to those of the structure (which is conventionally the case in civil engineering, the dimension of the test body being between approximately 0.5 cm and 10 cm, for example, and the dimension of the structure being at least equal to one meter, sometimes greater than 10 or even 100 meters), a measurement is obtained that is a local measurement at the scale of the structure.

Moreover, the processor 11 is also adapted to determine the stresses in the structure at the location of the measurement fiber from the stress in the optical fiber. The processor 11 may hold in memory a table comprising the mechanical characteristics of the test body. These characteristics typically include the modulus or moduli of elasticity for each of the principal directions of the material, or even the Poisson coefficient or coefficients in this frame of reference, where appropriate as a function of certain numbers of external parameters (temperature, etc.).

The equations set out in the paper by J. D. Eshelby (The determination of the elastic field of an ellipsoidal inclusion and related problems, J. D. Eshelby, Proceedings of the Royal Society of London, Vol. 241, (1957), pp. 376-396]) are programmed in the processor. They make it possible to estimate the stress and the deformation that would be present in the structure 1 at the location of the test body but in the absence thereof from the stress measured in the ellipsoid by the measurement fibers.

Figure 9:
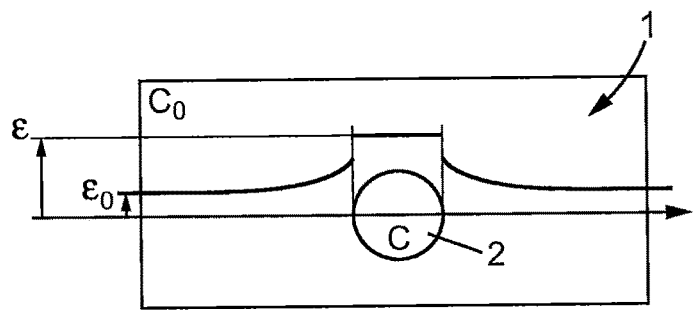
FIG. 9 is a diagram illustrating the deformations field within the structure.
Figure 10:
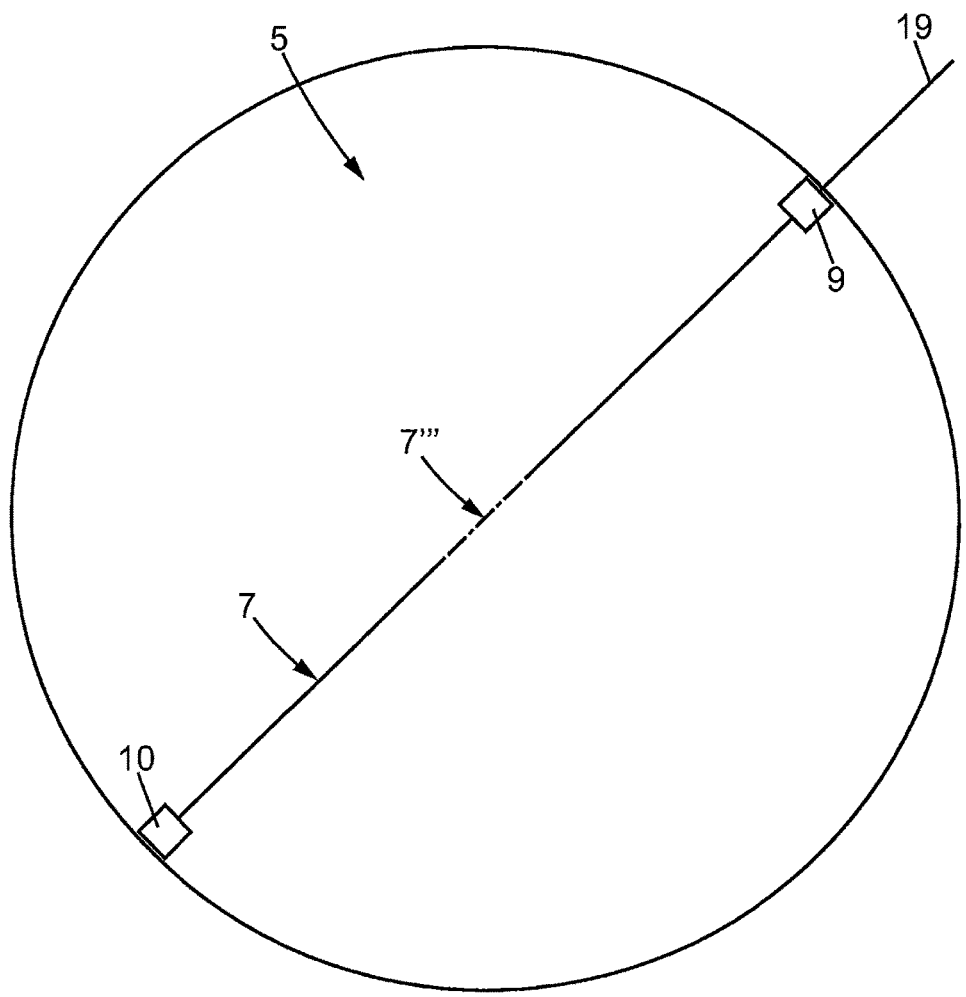
FIG. 10 is a diagram similar to FIG. 8 for another embodiment.

The fact of disposing the sensors inside a solid ellipsoid is not anodyne. As explained by Eshelby, if the inclusion and the matrix have a linear elastic behavior and if the medium is subjected to a loading "at infinity", the deformation field (and the stress field) is uniform in the inclusion (cf. FIG. 9). The location of the sensitive parts of the uniaxial measurement fibers inside the ellipsoid is therefore not of great importance, the quantities relating to one and the same tensor being measured at any point of the ellipsoid. This applies when, as in the present case, the test body is small compared to the gradient of the deformation field.

An infinite isotropic matrix is considered. Its isotropic elasticity is given by its elasticity tensor $C_0$. This is the magnitude that it is required to determine.

Within this medium exists an ellipsoidal inclusion 2 made from a homogeneous and isotropic material the elasticity tensor of which is C. It is implicitly understood that an ellipsoidal inclusion made from a homogeneous material is solid.

This system is subjected, at infinity, to a deformation $\varepsilon_0$. In the absence of the inclusion, this deformation would be homogeneous (identical at all points). In the presence of the inclusion, the deformation in the matrix is disturbed locally and the deformation $\varepsilon$ in the inclusion is different but homogeneous (see FIG. 9), which is shown by Eshelby's calculations.

This is the first advantage for the sensor: the measurement may be made anywhere within this ellipsoid: there is no requirement for a spatial mean.

In one embodiment, the tensor e of the deformations in the inclusion is measured by six unidimensional sensors, as described elsewhere. From the Eshelby calculation [1957], this deformation $\varepsilon$ is linked to the deformation $\varepsilon_0$ at infinity by the localization equation:

$$\varepsilon = (I + P_0 : (C - C_0))^{-1} : \varepsilon_0 \quad (1)$$

where I is the fourth order identity tensor and $P_0$ is the Hill tensor that depends on the geometry of the ellipsoid and on $C_0$. If the elasticity tensors C of the inclusion and $C_0$ of the matrix are known, this equation, when inverted, enables analytical derivation of the deformation $\varepsilon_0$ that would exist in the matrix in the absence of the inclusion, which is an undoubted advantage: the magnitude supplied is the deformation that would exist in the structure 1 in the absence of the sensor.

A more detailed example is given hereinafter in the case of an inclusion 2 of spherical shape (simplified case to facilitate reading).

If a respective homogeneous isotropic medium is considered for the matrix and the inclusion, their elasticity tensors are expressed in the following Kelvin form:

$$C_0 = 3K_0 P^H + 2\mu_0 P^D \quad (2)$$

$$C = 3K P^H + 2\mu P^D \quad (3)$$

where $K_0$ and K are respectively the moduli of hydrostatic compressibility of the matrix and the inclusion and $\mu$ and $\mu_0$ are their shear moduli. These magnitudes are respectively related to the Young's moduli ($E_0$; E) and to the usual Poisson coefficients ($\nu_0$; $\nu$) by the equations:

$$3K_0 = E_0/(1-2\nu_0) \quad 3K = E/(1-2\nu) \quad (4)$$

$$2\mu_0 = E_0/(1+\nu_0) \quad 2\mu = E/(1+\nu) \quad (5)$$

The tensors $P^H$ and $P^D$ are respectively the hydrostatic and deviatoric projectors. They are expressed as a function of the Kronecker symbol:

$$(P^H)_{ijkl} = (1/3)\delta_{ij}\delta_{kl} \quad (6)$$

$$(P^D)_{ijkl} = (1/2)(\delta_{ik}\delta_{jl} + \delta_{il}\delta_{jk}) - (\delta_{ij}\delta_{kl})/3 \quad (7)$$

The fourth order identity I is the sum of the two orthogonal projectors $P^H$ and $P^D$:

$$(I)_{ijkl} = (1/2)(\delta_{ik}\delta_{jl} + \delta_{il}\delta_{jk}) \quad (8)$$

In Eshelby [1957], there is found the expression for the Hill tensor $P_0$ in the case of the spherical inclusion:

$$P_0 = [1/(3K_0 + 4\mu_0)] \cdot P^H + [(3/5\mu_0) \cdot (K_0 + 2\mu_0)/(3K_0 + 4\mu_0)] \cdot P^D \quad (9)$$

and all the terms of the localization equation (1) are therefore defined. By grouping all these expressions, the inverse localization relation (the inverse of equation (1)) which gives the required value $\varepsilon_0$ of the deformation in the matrix at infinity as a function of the deformation $\varepsilon$ in the ellipsoid (as measured):

$$\varepsilon_0 = \{[(3K + 4\mu_0)/(3K_0 + 4\mu_0)]P^H + [3K_0(3\mu_0 + 2\mu) + 4\mu_0(2\mu_0 + 3\mu))/(5\mu_0(3K_0 + 4\mu_0))]P^D\} : \varepsilon \quad (10)$$

$\varepsilon_0$ is an example of a value to be determined. Indeed, for such a system, $\varepsilon_0$ also represents the local deformation in the structure at the location of the test body in the absence of the test body.

This is an example of an equation that is useful in the case of the proposed system. Using the behavior relation, the other measurement result is deduced therefrom, the tensor of the stresses in the matrix at infinity (i.e. locally at the location of the test body in the theoretical case of the absence of the sensor):

$$\sigma_0 = [(3K_0 \cdot (3K + 4\mu_0)/(3K_0 + 4\mu_0)] \cdot P^H + (2/5) \cdot [(3K_0 \cdot (3\mu_0 + 2\mu) + 4\mu_0 \cdot (2\mu_0 + 3\mu))/(3K_0 + 4\mu_0)]P^D) : \varepsilon \quad (11)$$

In an equivalent manner, by denoting by ($\varepsilon^H$; $\varepsilon_0^H$) and ($\varepsilon^D$; $\varepsilon_0^D$) the respective hydrostatic and deviatoric parts of the deformations $\varepsilon$ in the inclusion and $\varepsilon_0$ at infinity:

$$\varepsilon_0^H = (3K + 4\mu_0)/(3K_0 + 4\mu_0)\varepsilon^H \quad (12)$$

$$\varepsilon_0^D = [(3K_0 \cdot (3\mu_0 + 2\mu) + 4\mu_0 \cdot (2\mu_0 + 3\mu))/(5\mu_0 \cdot (3K_0 + 4\mu_0))]\varepsilon^D \quad (13)$$

The traditional expression for these terms without using projectors is:

$$\varepsilon_0{}^H=(1/3)\mathrm{trace}(\varepsilon_0)I \quad (14)$$

$$\varepsilon_0{}^D=\varepsilon_0-\varepsilon_0{}^H \quad (15)$$

The tensor $\sigma_0$ of the stresses in the matrix at infinity (or in the absence of the sensor) is obtained with the aid of the behavior relation (2):

$$\sigma_0{}^H=(3K_0\cdot(3K+4\mu_0)/(3K_0+4\mu_0))\cdot\varepsilon^H$$

$$\sigma_0{}^D=(2/5)\cdot[(3K_0\cdot(3\mu_0+2\mu)+4\mu_0\cdot(2\mu_0+3\mu))/(3K_0+4\mu_0)]\varepsilon^D \quad (17)$$

In the case of a heterogeneous structure (in the case where it contains inclusions with different mechanical characteristics (as in the case of aggregates in concrete, for example)), the sensitive parts of the fibers are preferably disposed relatively far away from the surface of the ellipsoid (therefore toward the interior) in order to smooth the stress field in the structure. The ellipsoidal shape furthermore makes it possible not to create any stress concentration liable to lead to cracking of the structure. Moreover, the material constituting the ellipsoid could be one for which the yield stress is greater than that of the material of the structure.

When an ellipsoidal test body is available, it is notably possible to determine the tensor of the stresses in the structure in the location from the tensor of the deformations detected in the fiber. The process may comprise two steps by determining the uniform stress in the test body from the deformations of the tensor measured by the fibers and then determining the tensor of stresses in the structure at the location of the test body using the Eshelby theorem on the basis of the tensor of the stresses in the test body.

In the present situation where there is a single uniaxial measurement fiber in the test body, the measured deformation may be associated with the mean state of tension (traction or compression) in the direction of the measurement fiber.

In mechanics, space is considered to comprise six dimensions. These are three principal axis dimensions and three dimensions associated with pairs of these axes.

In the case where there are six measurement fibers distributed in six directions in space $n^I$ (where $n^I$ is the unitary vector corresponding to the direction of the measurement fiber I=(1, . . . 6)), the hypothesis (decoupling) applies whereby the fiber measures a scalar deformation $\varepsilon^I$ similar to its variation relative to the length $\Delta L^I/L^I$ if $L^I$ designates its initial dimension and $\Delta L^I$ the variation of dimension relative to the initial dimension. If $\varepsilon$ denotes the tensor of the deformations in the test body, $\varepsilon^I=n^I\cdot\varepsilon\cdot n^I$ applies where $\varepsilon^I$ designates the $i^{th}$ component of the deformations tensor. In component form, this is written $\varepsilon^I=\varepsilon_{ij}\,n^I_i\,n^I_j$, where $n^I_i$, $n^I_j$ designate the $i^{th}$, respectively $j^{th}$ component of the vector $n^I$ and $\varepsilon_{ij}$ the component $(_{i,j})$ of the deformations tensor. The six scalar equations obtained may be converted to matrix form $N^{IJ}\varepsilon_j=\varepsilon^I$ where the index J varies from 1 to 6 as a function of the indices i and j in accordance with the convention (11,22,33,23,31,12) and where $N^{IJ}=n^I_i\,n^I_j$. This matrix equation is then inverted, yielding the deformations tensor $\varepsilon$ (in the form $\varepsilon_j$ or $\varepsilon_{ij}$) looked for. The possibility of inverting the matrix $N^{IJ}$ is guaranteed by the independence of the measurement directions $n^I$. The choice of directions $n^I$ regularly dividing up the space (the normals of a dodecahedron) guarantees maximum robustness of the measurement.

The tensor $\varepsilon$ obtained is the tensor of the deformations in the ellipsoidal test body. It is associated with the tensor $\sigma$ of the stresses in this same object by Hooke's law:

$$\sigma=\lambda\mathrm{trace}(\varepsilon)Id+2\mu\varepsilon$$

where $\lambda$ and $\mu$ are the Lame elasticity constants of the test body and Id is the identity matrix. The stresses tensor of interest for the system is that which would exist in the structure in the absence of the sensor: it is denoted $\sigma_0$. It is related to the measured stresses tensor $\sigma$ by the Eshelby equations cited hereinabove (they are notably simpler in the case of a spherical sensor). $\sigma_0$ is therefore determined from $\sigma$ by the Eshelby equation. Finally, the tensor $\varepsilon_0$ of the deformations that would exist in the matrix in the absence of the sensor is very simply obtained from $\sigma_0$ by inverting Hooke's law $\sigma_0=\lambda_0\,\mathrm{trace}(\varepsilon_0)\,\mathrm{Id}+2\mu_0\varepsilon_0$ where $\lambda_0$ and $\mu_0$ are the Lamé elasticity constants of the matrix (of the structure). The sensor therefore supplies these tensors $\varepsilon_0$ and/or $\sigma_0$ relating to the stress and deformation state of the structure as a function of time and the location of the sensor.

Alternatively, if the fibers are totally buried in the test body, coupling may occur and the foregoing hypothesis of decoupling leading to $\varepsilon^I=n^I\cdot\varepsilon\cdot n^I=N^I:\varepsilon$ is no longer valid. In this case, the magnitudes $\varepsilon^I$ measured by the fibers are given by $\varepsilon^I=M^I:\varepsilon$ in which $M^I$ depends on $n^I$ and directions orthogonal to $n^I$. The inversion, which is slightly more complex, is obtained by the calculation of the coupling coefficients (influence of orthogonal directions) operating in $M^I$.

The measurement of the deformation $\varepsilon^I$ of the fiber can be obtained by an optical index variation measurement. The general relation is $\Delta(1/\eta^2{}_{ij})=P_{ijkl}\,e_{kl}$ in which the tensor e represents the deformation in the fiber, $\eta$ is the tensor of the optical indices, P the elasto-optical tensor of the material constituting the fiber (for example silica) and $\Delta$ the symbol of variation between the non-stressed and current states. The connection between the thin fiber and the massive test body guarantees that the deformation of the fiber and of the test body are identical in the direction of the fiber: $n^I\cdot\varepsilon\cdot n^I=n^I\cdot e\cdot n^I$. The other components of the tensor e will be related either to $\varepsilon$ and to the elasticity characteristics by an Eshelby calculation (this time for a cylindrical inclusion) when the fiber is "stuck" to the matrix or simply to the elastic characteristics of the fiber (its Poisson coefficient if it is mechanically isotropic) if it is merely fixed at its ends. In this second case, the decoupling hypothesis referred to in the previous paragraph again applies. The fiber may be pretensioned, above all in the case of the fiber being stuck at its ends, in order for it to remain under tension whatever the loading on the test body.

It will be noted that a two-step calculation is not necessarily employed, and that the processor could if necessary determine the local stress directly from the signals detected and the mechanical properties of the material constituting the test body and that of the structure, on the basis of the above teaching.

The test bodies seen more particularly in FIGS. 1, 2, 3 and 6 are of ellipsoidal shape but a spherical shape may be chosen, for example in cases where it would not be desirable to introduce a preferential direction for measurements in an isotropic medium or if the orientation of this test body could not be controlled when incorporating the test body into the structure. Otherwise the chosen shape could be an ellipsoid elongate in one or two particular directions in space and adjust a requirement for measurement in preferential directions in space. In a similar manner, the chosen material constituting the ellipsoid may be isotropic so as to transmit the stresses identically in all directions in space, but could for some applications be anisotropic, that is to say to behave mechanically in different ways in one or more dimensions in space. This latter case could apply for example to situations where the measured magnitudes differ in terms of scale or in terms of the processing that is applied to them during acquisition of the measurements, or if the material constituting the structure is itself anisotropic. The constituent material may be chosen so as to be homogenous at least relative to the dimensions of the measurement length of the measurement optical fibers so as to avoid local variations when transmitting the stresses from the test body to the measurement fibers. The use of a test body also has the additional advantage of making it possible to chose a material that is particularly suitable for the transmission of the stresses from the measurement volume to the measurement fiber. It therefore makes it possible to measure the magnitudes present in a measurement volume constituted of a material that is relatively unfavorable in terms of the integration of measurement fibers. This might be the case for a measurement volume material that is non-homogenous or includes discontinuities or is merely unsuitable for making a mechanical connection with the material constituting the exterior of the measurement fiber. The material chosen for producing the test body may be chosen so as to optimize the accuracy of the measuring device, for example through having mechanical properties very similar to or identical to those of the measurement volume. In addition to choosing an ellipsoidal shape, such a choice of mechanical properties makes it possible to minimize stress concentrations in the vicinity of the measuring device and to reduce the risks of weakening of the structure through the formation of cracks. The addition of test bodies included in a measurement volume that represents a structure should preferably not be reflected in weakening of the material. The material chosen to constitute the test body could be chosen according to the envisaged application on the one hand for the use and on the other hand for the manufacture of the measuring device. The choices may include fine concretes (for example of Ductal type), resins, which may be charged with reinforcements so as to produce composite materials with a composition that enables adjustment of their mechanical properties, metals, glasses or ceramics. Depending on the material, the fibers may be introduced by drilling it or by overmolding it. Moreover, additional criteria for choosing the material of the test body may be linked to durability, toxicity or cost.

The system that has just been described may therefore be used in the following manner: a laser type stimulation device 9 emits an optical signal into the optical fiber. The optical signal propagates along the optical fiber and through the measurement fiber 7, in which it is modulated as a function of the mechanical stresses exerted on the fiber 7. The modulated optical signal is transmitted along the optical fiber 8b to a detector 10, of CDD type, for example, where the signal is detected, and then stored in the memory 12 of the processor. It will be noted that such transmission is possible even in the event of deformations at the level of the test body, because the measurement fibers 7 operate as waveguides. The processor processes the information to determine a stress in the structure 1 at the level of the test body.

This interrogation may be repeated over time, for example periodically. The processor is therefore able to monitor temporal evolution of the local stress exerted. The processor may be coupled to alert means if a comparison of the stresses detected with a predetermined stress is not deemed satisfactory.

Figure 3:
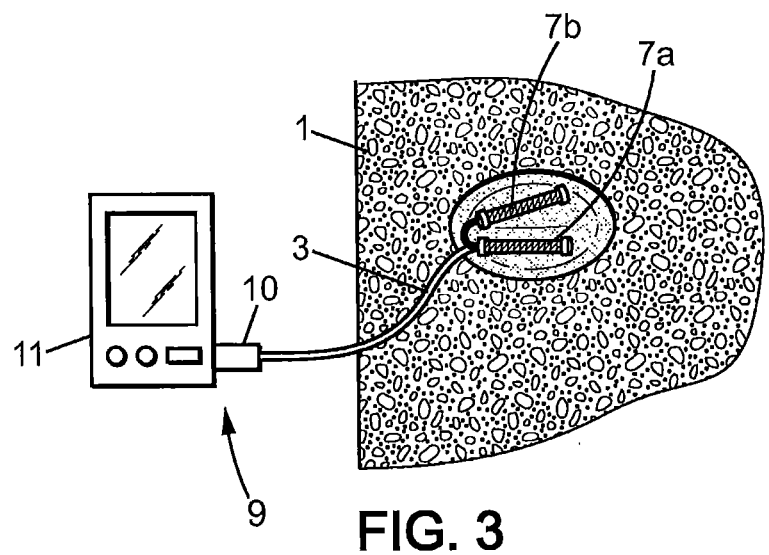
FIG. 3 is a view of an example with two interconnected measurement optical fibers placed in an ellipsoidal test body and connected by connecting means grouped into a bundle enabling stimulation of the measurement optical fibers and transmission of the signals coming from the measurement fibers to an electronic device adapted to perform calculations.

As will have been clear from the above description of FIG. 2, the Eshelby theorem makes it possible to retrieve different components of the stresses tensor at the localized location, provided that as many independent local components can be measured. Accordingly, in accordance with a second embodiment, as represented in FIG. 3, two measurement fibers 7a and 7b are disposed along two independent axes (notably two normal axes defining a measurement plane). Moreover, the embodiment of this figure also differs from the first embodiment in that an integrated system provides both stimulation and acquisition. Thus it is not the optical signal transmitted by the optical fiber that is detected, but the reflection of this signal. The channel 3 therefore groups together within an optical cable the two optical fibers addressing each of the measurement fibers. The diameter of this kind of cable remains small compared to the dimensions of the test body and a fortiori of the structure.

By performing two measurements in independent directions it is possible, as demonstrated above, to determine two relations between the components of the deformation tensor in the structure at the level of the test body by solving a system of two equations in two unknowns. If the sensor is oriented with the measurement fibers aligned with the principal directions of the forces at this location, determined a priori by a structural analysis, principal components of the deformation tensor are obtained.

Figure 4:
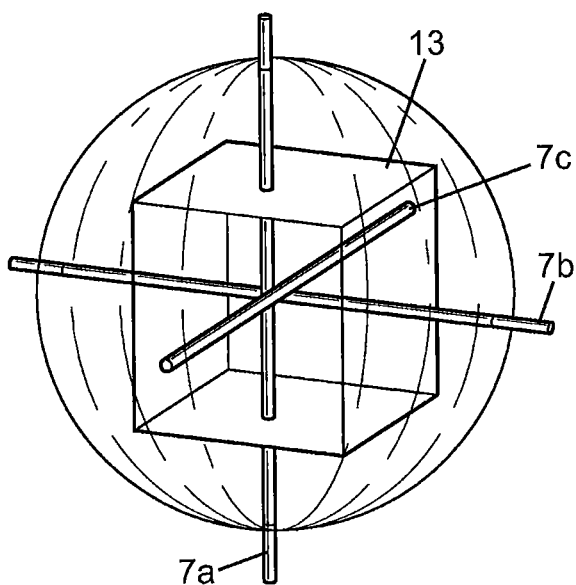
FIG. 4 is a view representing a test body placed in a measurement volume and provided with three mutually orthogonal measurement optical fibers enabling estimation rather than measurement of the pressure in the structure.

Alternatively, as represented in FIG. 4, the test body comprises three measurement fibers 7a, 7b, 7c disposed in three independent directions, for example normal to the faces of a cube 13. The fibers are spaced slightly so as not to be concurrent. By performing three independent measurements it is possible, as demonstrated above, to determine three components of the tensor of the deformations in the structure at the level of the test body by solving a system of three equations in three unknowns.

The sum of these three measurements is the trace of the deformations tensor, which provides access to the trace of the stresses tensor, which is invariant: it is three times the pressure.

Figure 5:
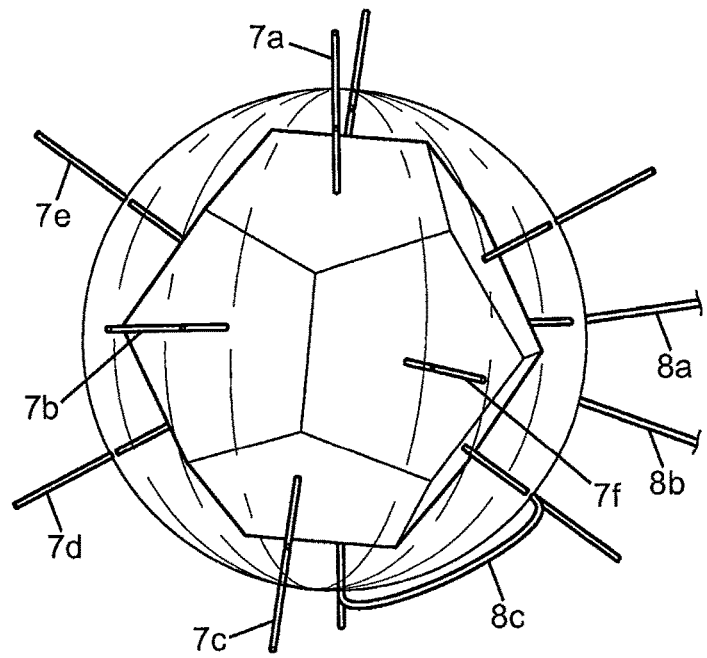
FIG. 5 is a view of a test body placed in a measurement volume provided with six sensors oriented in directions distributed in space perpendicularly to the faces of a regular dodecahedron, making possible estimation rather than measurement of the values of the six independent components of the stress tensor.

In accordance with a further embodiment, as represented in FIG. 5, six measurement fibers 7a-7f are used. They are disposed along the normals to the faces of a regular dodecahedron, for example. These six measurements constitute six independent variables that make it possible to determine the six components of the stresses tensor in the structure at the location of the test body by solving a system of six equations in six unknowns. Six optical fibers are used, for example, wound to a greater or lesser degree around the test body, and grouped together in the same optical cable running in a channel 3.

Alternatively, a plurality of measurements could be addressed with the same optical fiber by spectral analysis. To this end, an optical fiber could be used that has a first section 8a extending from the stimulation device to the test body and a second section forming a first measurement fiber that can be stimulated at a given wavelength, as in the FIG. 1 embodiment. Instead of connecting the output of the measurement fiber directly to the sensor 10, an additional section 8c is provided that is wound around the test body to connect the first measurement fiber to a second measurement fiber extending in a second direction. The second measurement fiber can be stimulated at a second wavelength far from the first. This method is therefore used to connect the required number of measurement fibers before connection of the output to the detector 10. The stimulation can therefore comprise an addition of signals having different characteristics and detection is able to demodulate the signal in order to attribute to each measurement fiber the portion of the signal that is specific to it. Such an embodiment is possible with between two and six measurement fibers, or even more if necessary.

Moreover, using two parallel measurement fibers in one direction within the ellipsoid, it is possible to obtain an idea of the spread of the characteristics of the measurement fibers in a direction normal to this direction. The above embodiments may therefore have added to them one or more parallel measurement fibers.

The above description relates to a single location of the structure 1. As in an alternative represented in FIG. 6, the same system may be reproduced for a set of locations 2 of the structure 1. This applies to any of the embodiments described above. If necessary, a single stimulation system 9 and detection system 10 and a single processor 11 are used. The test bodies 5 are interconnected by optical cables located in channels 3 extending between the various locations.

The spectral modulation described above therefore does not necessarily apply only to the case of two fiber portions of the same test body extending in two different directions. For example, the same optical fiber could extend continuously through different test bodies and the spectral modulation correspond to the location of each test body. Alternatively, other, so-called distributed measurement methods could be used that make it possible to determine the location in the fiber and therefore which sensor is involved.

It is therefore possible to produce a map of the stresses tensors, which makes it possible to produce a map of certain stresses, and obviously to track the evolution of these stresses over time, as in the case of a single localized sensor. It is therefore not necessarily a local stress variation that can trip an alarm, but the observation of any anomaly on the basis of the detected field of temporal stresses, for example, relative to a reference map established as a function of the external loading by a structural calculation possibly assisted by a measurement on the structure at an initial time deemed to be free of defects.

The present embodiments can be integrated into an existing structure, for example by producing a location of ellipsoidal shape in the structure, hollowing out at least one channel, or even channels extending through this shape, tensioning an optical fiber in this channel or these channels, the active portion of the fiber being at the location of ellipsoidal shape; and then injecting a liquid product adapted to solidify (for example a concrete of known mechanical properties) into the location in order to embed the fiber therein.

Figure 6:
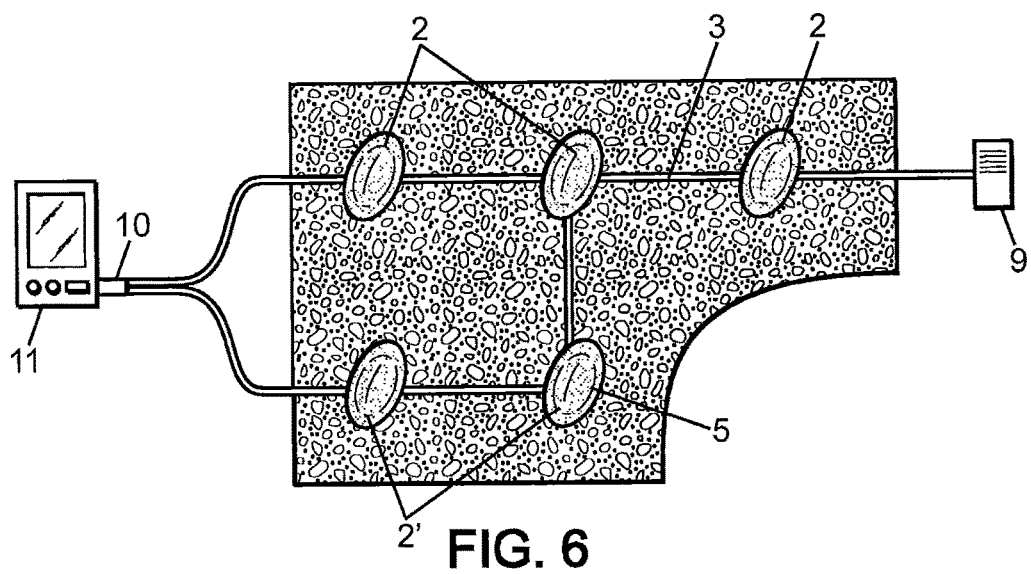
FIG. 6 is a view representing a multiplicity of test bodies distributed in a measurement volume representing a structure part.
Figure 7:
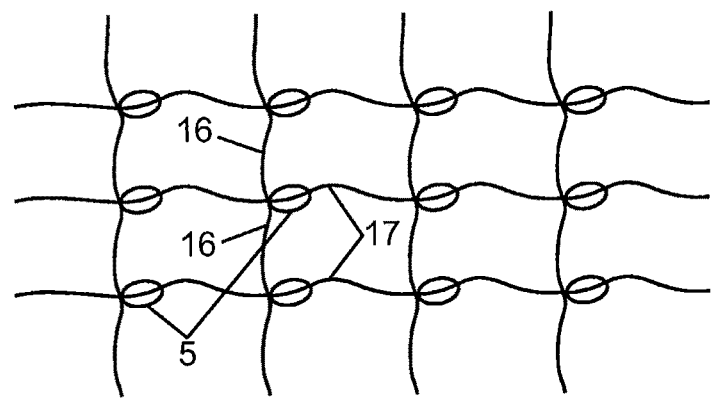
FIG. 7 represents a multiplicity of sensors constituted of test bodies containing one or more measurement optical fibers interconnected by connecting means forming an array enabling access to measurements in locations regularly spaced in an extensive part of a measurement volume constituting a structure part.

Alternatively, as represented in FIG. 7, a structure under construction could be equipped directly with an integrated monitoring system of the type described above. Thus a two-dimensional net 15 is used comprising different test bodies 5 disposed in rows and in columns, for example, and interconnected by optical cables 16 in accordance with a scheme similar to that shown in FIG. 6. Alternatively, a three-dimensional net may also be envisaged.

In accordance with a first example, each optical cable 16 may for example include a set of n times 6 optical fibers where n represents the number of test bodies along the axis. Six of the optical fibers each address one of the six channels of a test body while the other optical fibers bypass the latter. At the output, all the fibers are again grouped and directed toward the next test body, where six other fibers each address a respective channel of the latter, and so on. Thus a vertical optical cable 16 addresses all the test bodies 14 of a column. The ends of the vertical cables are grouped together and directed toward a stimulation/acquisition system as described above. If necessary, the vertical cables are connected together by retaining elements 17 which are not necessarily optical in this example. Alternatively, an optical fiber could address each of the six channels of the same test body, as indicated above, or the same channel of all the test bodies, and the information obtained by spectral or spatial analysis, as indicated above. Alternatively, the cables 17 could equally be optical cables addressing some channels of some test bodies. The use of such a net could therefore easily be varied to adapt to the specifics of the measurement to be accomplished. To produce a 3D system, a plurality of such nets may be proposed disposed one behind another with a certain spacing in the plane normal to that of FIG. 7. This net could be fixed into the concrete of a structure under construction.

In the above examples, reference has mainly been made to applications of civil engineering type, where the optical fiber is buried in a concrete test body, itself intended to be integrated into a concrete structure. The invention could instead be applied in other types of structures. For example, there are known, composite structures constituted of plastics reinforced with fibers, notably with glass fibers. The fact of using optical fibers, and therefore fibers notably made of glass, to implement the above detection process is of particular benefit when it comes to adapting the above system to such composite systems. In fact, the measurement part of the optical fiber may then be buried in a plastic of the kind used in such structures and the rest of the optical fiber could have mechanical properties similar to those of the fibers of the composite material. It will be noted that such structures comprise fibers most often extending in a plane and that, for this kind of application, there is the risk of preferring to use the embodiments making it possible to determine the components of the stresses tensor in that plane.

The known mechanical properties of the material of the test body makes it a simple matter to go from the stresses tensor to the deformations tensor. Although this description has mainly referred to the stresses tensor, it will therefore be clear that a similar description could apply to the deformations tensor.

Alternatively, the processor could be provided with communication means, where necessary wireless communication means, for transmitting an alarm signal to a surveillance center. Consequently, the processor could be integrated into the structure, or even into a test body. Alternatively, the detector could be provided with communication means, if necessary wireless communication means, for transmitting the measured signals to a remote processor. If necessary, the processor could be divided into two parts communicating with each other via communication means, if necessary wireless communication means.

A temperature sensor could instead be disposed in Or near the test body, with an electrical cable transmitting a local measured temperature value to the central unit. This temperature may be taken into account in the calculation of the stresses.

In the examples given above, reference is made to a measurement fiber that is a component separate from the test body and assembled to the test body by inserting it via a channel of the test body and fixed thereto.

A measurement fiber integrated directly into the test body could be used instead. In the optical version, a waveguide (comprising the active area 7''' (comprising for example a Bragg grating)) may be inscribed directly in the test body. Processes of photo-inscription, ionic implantation or irradiation may be envisaged for this application. Such an application makes it possible to improve further the mechanical homogeneity of the measuring device. It is therefore possible to produce an inscribed waveguide such as, for example, an FBG (Fiber Bragg Grating) or an LPG (Long Period Grating). In this case, the test body 5 could advantageously be made from a translucent material.

The test body 5 formed in this way may be disposed in the structure with the integrated inscribed waveguide that has just been described in correspondence with connecting optical fibers 8 disposed in the channels 3 and leading to the stimulation system 9 and/or to the detection system 10.

As a further alternative, the stimulation system 9 and/or the detection system 10 may be integrated into the test body 5 in any of the variants proposed hereinabove. In this case, the means for connecting the measurement fiber 7 or the waveguide inscribed in the stimulation system 9 and/or the detection system 10 may comprise any means for fixing the stimulation system 9 and/or the detection system 10 enabling the latter to be fixed in corresponding relationship with the measurement fiber 7, for example by gluing or mechanical fixing to the test body.

The stimulation system 9 and/or the detection system 10 may be connected to the outside by one or more electrical wires 19, notably for the supply of power. The detection system 10 may be connected to the outside by wire or wireless connection means for the transmission of the measurements. When the processor 11 is integrated into a test body, as described above, it may be connected to the outside by one or more electrical wires 19, notably for the supply of power. It may be connected to the outside by wire or wireless connecting means for the transmission of the results. For wireless transmission in concrete, transmission by acoustic waves may be employed. Electrical wires may be configured as nets, for example, as represented in FIGS. 6 and 7.

The invention claimed is:

1. A device for measuring stresses and/or local deformations within a measurement volume of a structure of materials having known mechanical properties, wherein the device comprises:
   a test body of ellipsoidal shape intended to be included in the measurement volume and constituted of a homogeneous material with known mechanical properties,
   at least one deformation measurement fiber attached to the interior of said test body so that deformations of the test body are transmitted to the measurement fiber, and
   means for connecting the at least one measurement fiber to a system adapted to detect signals coming from the measurement fibers representing deformations of the measurement fiber and to determine the stresses and/or the local deformations from at least one of the detected signals and the known mechanical properties of the materials of the test body and of the structure,
   k deformation measurement fibers attached to the interior of the test body and adapted to determine independent components of the tensor of the stresses in the test body, wherein k is equal to 6 and the axes of the measurement fibers are substantially perpendicular to the faces of a regular dodecahedron.

2. The device as claimed in claim 1, wherein the measurement fibers are measurement optical fibers and wherein the connecting means are adapted to connect the measurement fiber to a system adapted to stimulate at least one measurement optical fiber.

3. The device as claimed in claim 2, wherein the connecting means are devices comprising optical fibers in optical communication with the at least one measurement fiber.

4. The device as claimed in claim 3, wherein the connecting means are adapted to transmit a stimulation signal to the at least one measurement fiber and to transmit from the at least one measurement fiber a signal resulting from an interaction between the measurement fiber and the stimulation signal.

5. A device for measuring stresses and/or local deformations within a measurement volume of a structure of materials having known mechanical properties, wherein the device comprises:
   a test body of ellipsoidal shape intended to be included in the measurement volume and constituted of a homogeneous material with known mechanical properties,
   at least one deformation measurement fiber attached to the interior of said test body so that deformations of the test body are transmitted to the measurement fiber,
   means for connecting the at least one measurement fiber to a system adapted to detect signals coming from the measurement fibers (representing deformations of the measurement fiber and to determine the stresses and/or the local deformations from at least one of the detected signals and the known mechanical properties of the materials of the test body and of the structure,
   k deformation measurement fibers attached to the interior of the test body and adapted to determine independent components of the tensor of the stresses in the test body, where k is between 2 and 6,
   the device further comprising ko deformation measurement fibers arranged in a non-independent manner in the fibers, where ko is between 1 and k.

6. The device as claimed in claim 5, wherein k is equal to 3.

7. The device as claimed in claim 1, wherein each measurement fiber is attached at its ends to the test body.

8. The device as claimed in claim 1, comprising an acquisition system on the downstream side of the connecting means adapted to acquire and to store said signals.

9. The device as claimed in claim 1, further comprising a processor connected to the at least one measurement fiber adapted to determine spatial components of the field of stresses and/or local deformations from the signals.

10. The device as claimed in claim 1, wherein the material constituting the test body is isotropic.

11. A device for measuring stresses and/or local deformations within a measurement volume of a structure of materials having known mechanical properties, wherein the device comprises:
   a test body of ellipsoidal shape intended to be included in the measurement volume and constituted of a homogeneous material with known mechanical properties,
   at least one deformation measurement fiber attached to the interior of said test body so that deformations of the test body are transmitted to the measurement fiber,
   means for connecting the at least one measurement fiber to a system adapted to detect signals coming from the measurement fibers (representing deformations of the measurement fiber and to determine the stresses and/or the local deformations from at least one of the detected signals and the known mechanical properties of the materials of the test body of the structure, and
   wherein the mechanical properties of the material constituting the test body are identical to those of the sound material constituting the structure.

12. The device as claimed in claim 1, wherein the connecting means are grouped together in a single connecting cable.

13. The device as claimed in claim 1, comprising a plurality of interconnected test bodies.

14. The device as claimed in claim 1, wherein the measurement fiber is a component separate from the test body.

15. The device as claimed in claim 1, wherein the measurement optical fiber comprises a waveguide inscribed in the test body.

16. A mechanical structure comprising a measurement volume and a measuring device as claimed in claim 1.

* * * * *